April 27, 1965   W. W. ALLEN ETAL   3,180,020
METHOD OF BRAZING A PLURALITY OF LEADS TO
APERTURES IN A CERAMIC WAFER
Filed April 13, 1962   2 Sheets-Sheet 1
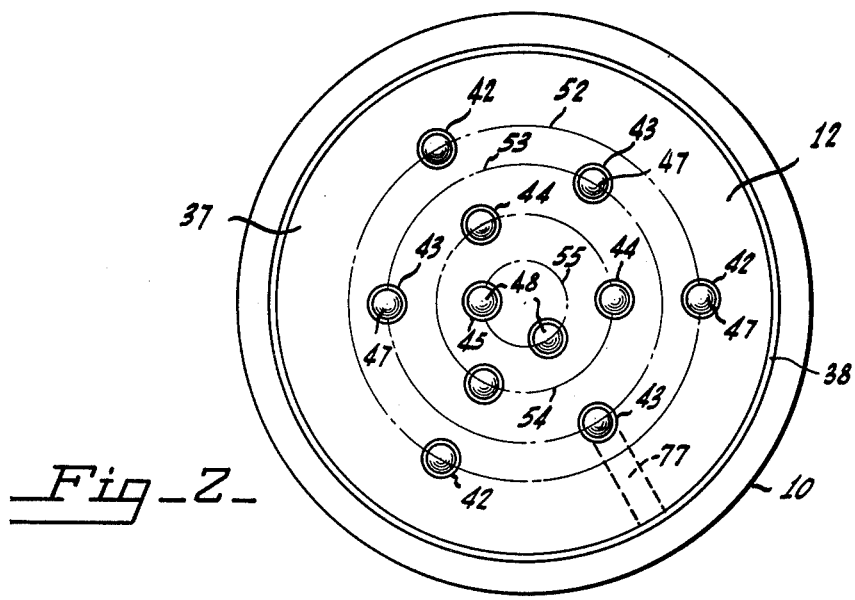
Fig_2_
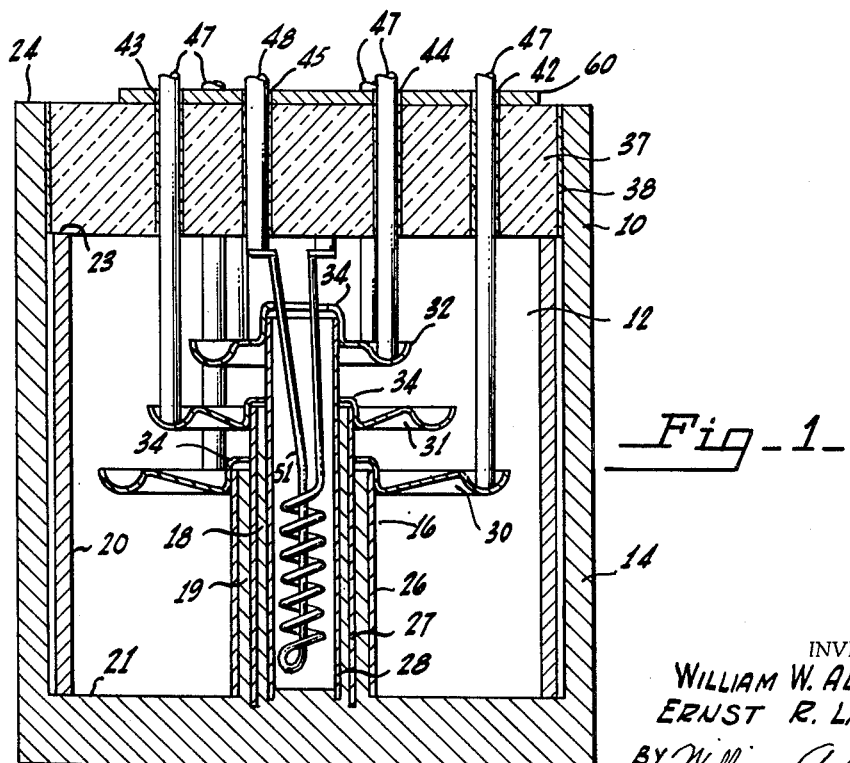
Fig_1_
INVENTORS,
WILLIAM W. ALLEN &
ERNST R. LARSON
BY William A. Zalesak
ATTORNEY INVENTORS,
WILLIAM W. ALLEN &
ERNST R. LARSON
BY William A. Zalesak
ATTORNEY 3,180,020
METHOD OF BRAZING A PLURALITY OF LEADS TO APERTURES IN A CERAMIC WAFER
William W. Allen, East Orange, and Ernst Raoul Larson, Fords, Edison Township, Middlesex County, N.J., assignors to Radio Corporation of America, a corporation of Delaware
Filed Apr. 13, 1962, Ser. No. 187,351
1 Claim. (Cl. 29—471.1)

This invention relates to braze sealing and braze joining, and particularly to an improved means and method for providing a plurality of brazed joints in articles of manufacture such as electron discharge devices.

One form of recently designed electron discharge device in which this invention is particularly useful, includes a structure comprising a flat wafer or disk header made, for example, of a ceramic material such as forsterite and having openings or bores extending therethrough, the walls of said openings being coated with a suitable bonding material such as molybdenum and the openings being arranged in a preselected pattern. Lead-in and support conductors, preferably of molybdenum, extend through the openings in the wafer and are bonded by brazing to the coated walls of the openings providing a relatively rigid and hermetic seal between the conductors and the wafer. The lead-in conductors and supports extend into the tube envelope, which is sealed to the periphery of the wafer, and are fixed as by brazing to the tube parts or electrode mount assembly within the envelope.

It is necessary to obtain vacuum tight seals between the lead-in support conductors and the metalized walls of the openings in the ceramic wafer by a brazing operation. To do this, brazing material is applied adjacent each of the joints to be formed before the brazing operation takes place. Upon heating, the brazing material melts and flows into the wafer openings and brazes each lead-in conductor to the wafer.

In the prior art it is the practice to place a ring or washer of brazing material over each of the lead-ins adjacent the header wafer. A problem with this, however, is that for a large number of joints to be formed, a large number of separate brazing material washers have to be provided. This has proven to be time-consuming and expensive. Thus, in one electron tube, for example, eleven lead-in conductors, each having a diameter of .016 inch are used and eleven brazing rings having an outer diameter of only .045 inch are required. Manual threading of each of these tiny rings onto the conductors is a difficult and tedious process. Further, even though automatic threading devices have been developed, the use of these devices still involves undesirable extra handling and assemblying operaitons of the wafer, conductors and brazing rings.

Therefore, an object of this invention is to provide an improved means and method of forming a plurality of brazed joints in a workpiece.

Particularly, an object of this invention is to provide improved means and method for quickly, simply, and inexpensively providing a plurality of sources of brazing material on a workpiece for forming a plurality of brazed joints.

For achieving the objects of this invention wherein, fro example, an electron tube of the type described is the workpiece, a brazing material assembly is used comprising a plurality of connected brazing material sources arranged in a pattern similar to the arrangement of the eleven openings through the wafer. The brazing material sources may be in the form of washers having narrow bridges connecting certain ones of the washers. As will be described hereinafter, the brazing material assembly is disposed on the mount wafer during mounting to position each washer adjacent a lead-in extending through a wafer bore. During brazing, the assembly melts and the brazing material in each washer flows into its adjacent wafer bore and into contact with the lead-in therein. The connecting bridges break apart, the brazing material therein also flowing into the wafer bores. The brazing material fills the space between the lead-ins and the wafer bore walls thus providing brazed joints therebetween.

In the drawings:

FIG. 1 is a longitudinal section of a brazing jig containing assembled parts of a mount including a brazing material assembly which may be used according to this invention;

FIG. 2 is a top plan view of FIG. 1, the brazing material assembly being removed for greater clarity;

Figure 3:
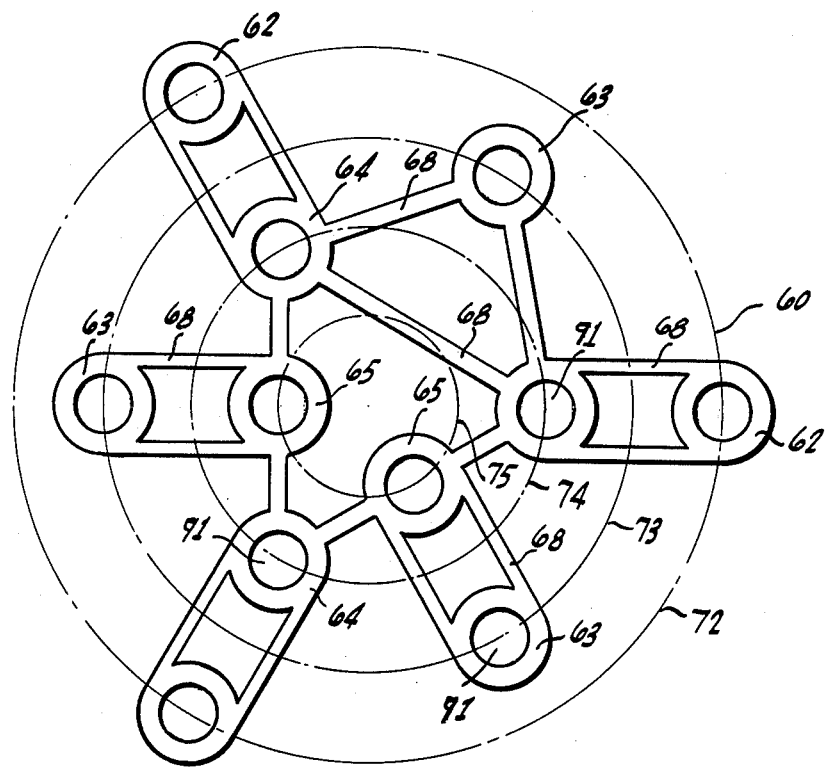
FIG. 3 is an enlarged view of a brazing material assembly which may be used in connection with the mount shown in FIGS. 1 and 2.

In FIGS. 1 and 2 is shown an assembly and brazing jig 10 containing assembled parts of a tube mount 12. Jig 12 comprises a cup-shaped shell 14 having a centrally disposed jigging assembly 16 comprising coaxial jigging cylinders 18 and 19. A circular insert 20 resting on the bottom 21 of jig 10 provides a ledge 23 within the jig adjacent the open end 24 thereof. The tube mount 12 assembled within jig 10 comprises tubular electrodes 26 and 27 and a tubular electrode support 28 received snugly within or around the jigging cylinders 18 and 19. Mounted on the ends of the tubular electrodes 26 and 27 and support 28 are electrode support flanges 30, 31 and 32, respectively, each flange comprising a centrally disposed tubular portion 34 in which the end of a tubular electrode 26 or 27 or electrode support 28 is received. Mounted on the ledge 23 provided by insert 20 is a header wafer 37 having sets of three bores 42, 43, 44 and a set of two bores 45 therethrough. Support and conductive lead-ins 47 and 48 extend through the bores and into engagement with the flanges and a heating element 51. As shown in FIG. 2, the bores 42, 43, 44 and 45, and hence, lead-ins 47 and 48 are arranged in a preselected pattern comprising four concentric circles 52, 53, 54 and 55 shown in phantom. Three bores 42, 43 and 44 are disposed in 120° equidistant relation on each of the circles 52, 53 and 54, respectively, and two bores 45 are disposed 120° apart on circle 55. The bores in adjacent circles 52–55 are angularly displaced 60° to provide maximum spacing therebetween.

By way of example, flanges 30, 31 and 32 may be made of steel. The conductive lead-ins 47 and 48 are made of molybdenum and header wafer 37 is made of a ceramic material such as forsterite. The joints between the various contacting mount parts are made by brazing. The brazing material for providing the brazed joints between the electrodes 26 and 27 and the electrode support 28 and the flanges 30, 31 and 32, and between the lead-ins 47 and the flanges, may be provided as a cladding of copper on each of the flanges. The brazing material for the joints between the lead-ins 47 and 48 and the wafer 37 is provided in the form of a brazing material assembly 60 (FIGS. 1 and 3). In the embodiment illustrated, the brazing material is copper. In order that the copper readily wet the lead-ins 27 and 28 and the walls of the wafer bores 42–45, the molybdenum lead-ins are coated with iron and the walls of the bores are coated with molybdenum. In some instances to further enhance the wettability of the lead-ins and bore walls by copper, the lead-ins may be further coated with copper and the bore walls further coated with iron.

As shown in FIG. 3, the brazing material assembly 60 comprises a sheet of copper which may be prepared from a blank by etching, stamping, or other known methods. In one embodiment the copper sheet is .005 inch thick. Sets of three washer-like members 62, 63 and 64 and a set of two washer-like members 65 are formed in the sheet, each washer providing the brazing material required for brazing one of the leads 47 or 48 within its corresponding bore 42–45. The washers 62–65 are all connected to form an integral assembly by means of links or bridges 68. For reasons to be described, each bridge 68 is made narrow, hence two bridges 68 between certain washers are used for greater rigidity of the assembly 60.

As mentioned, bores 42–45 through wafer 37 are arranged in a preselected pattern, and the washers 62–65 are arranged in a similar pattern. Thus the three washers 62 are arranged on a circle 72 and correspond to the three bores 42 on circle 52. Likewise, the remaining washers 62, 64 and 65 are arranged on circles 73, 73 and 75, respectively, corresponding to bore circles 53, 54 and 55, respectively. Thus, when the brazing material assembly 60 is mounted on wafer 37, it is possible to align each of the washers 62–65 with a corresponding wafer bore 42–45.

As will be described hereinafter, a preferred method of aligning the assembly 60 with the wafer bores is to place the washers 65 of brazing assembly 60 over the two heater lead-ins 48 extending through wafer 37, the other lead-ins having not yet been assembled. Engagement of these two washers with lead-ins 48 thus locates and aligns the remaining washers 62, 63 and 64 with bores 42, 43 and 44, respectively. For restraining movement of the brazing assembly 60 and to maintain the washers thereof in alignment with the wafer bores, the openings through washers 65 may be made slightly smaller in diameter than the diameter of lead-ins 48. Further, slits, not shown, may be provided in the wall of washers 65 permitting flexure of the washer walls and a gripping of the lead-ins thereby.

It is necessary that no bridges of brazing material remain on the wafer between the lead-ins after brazing. The reason for this is that different lead-ins contact different flanges secured in turn to different electrodes, and bridges of copper between the lead-ins would short the electrodes. Therefore, the brazing assembly is shaped to insure that during brazing the bridges between the washers break and the washers become separated from one another. To this end, the bridges 68 between the washers are made narrow with only a small amount of copper therein. As known, copper has a strong surface tension and upon heating and melting, the molten copper tends to ball up into a volume having a minimum surface area. Upon heating of the brazing assembly, therefore, this effect tends to draw the molten copper from the bridges 68 into the relatively large mass of copper in the washers. The narrow and weak bridges easily break and the material on each side of the break flows towards adjacent washers.

The break-up and flow of the bridge copper towards the washers is also aided by the fact that the non-metalized ceramic wafer portions between the lead-ins are not wettable by copper. Hence, there is little tendency for the copper to adhere to and remain on the wafer surface between the leads. Also, as mentioned, the bore walls and the lead-ins are coated so as to make them wettable by copper. The effect of this is that the molten copper is drawn off the face of the wafer and into the wafer bores and along the lead-ins.

To promote the flow of the molten copper into the wafer bores it is necessary that the copper contact either the lead-ins or the metalized wafer bore walls. During assembly, as described, a tight fit is provided between washers 65 and the heater lead-ins 48. For reasons to be described, however, it is desirable in the assembly of the type of tubes described to provide a loose fit between the remaining lead-ins 47 and the washers 62–64.

Figure 4:
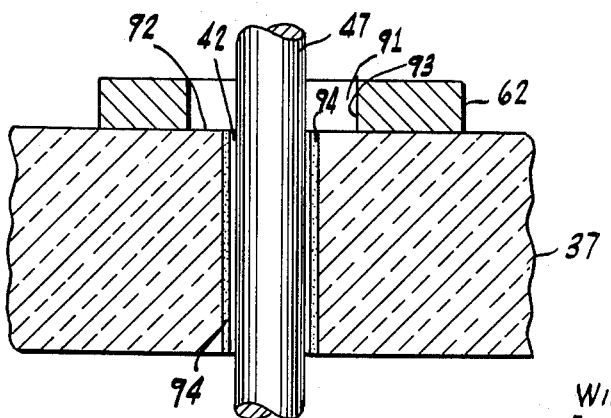
FIG. 4 is an enlarged view of a portion of FIG. 1 showing, in section, a brazing material assembly washer disposed adjacent a lead-in and a wafer bore.

The effect of such loose fit is illustrated in FIG. 4 wherein a washer 62 is shown having an opening 91 therethrough larger than the diameters of lead-in 47 and bore 42. Upon heating, it is thus necessary for the molten copper to span the gap 92 between the inner wall 93 of the washer and the metalized wall 94 of bore 42. The non-metalized ceramic portion or gap 92 is non-wettable by copper, which, along with the surface tension of copper, tends to prevent the copper from spreading over the gap 92 and into contact with the bore wall 94. The molten copper will spread, however, due to its own weight, the amount of spreading being dependent upon the depth of the original pool of copper, i.e., the thickness of washer 62. For the type of tubes described, the thickness of washer 62 is limited by a maximum amount of copper which may be employed for each joint, excessive amounts of copper providing a thick coating on the lead-ins which impedes socketing of the tube.

Thus, for a tube having 16 mil lead-ins, 17 mil diameter bore holes, and a brazing assembly 60 having washers with an outside diameter of 45 mils, it has been found that for a gap 92 of about 1.5 mils, a 5 mil thick washer is necessary to cause sufficient spreading of the copper over the gap and into contact wtih the bore wall 94. For a gap 92 of 3 mils, it has been found that a thickness of 5 mils does not produce sufficiently consistent results, a somewhat larger thickness being required. For other brazing materials and parts to be brazed, it is clear that other dimensional relationships are required. Such relationships may be found by trial and error experimentation.

The method of assembly of mount 12 involves loading electrode support 28 and tubular electrodes 26 and 27 within the jig assembly 10 in vertical spaced apart orientation, mounting the support flanges 30, 31 and 32 in relatively snug fit on the ends of the tubular electrodes and electrical support 26, 27 and 28, respectively, and inserting the header wafer 37 into jig 10 and onto ledge 23 to maintain it in spaced parallel relation with the flanges. Prior to the loading of wafer 37, two lead-ins 48 are threaded through wafer bores 45 and the heater element 51 secured thereto. Upon assembly of the wafer 37 into the jig, the heater element 51 is inserted within electrode support 28. Thereafter, according to a preferred method of assembly, the brazing material assembly 60 is placed over the two lead-ins 48 and adjacent wafer 37. Washers 65 snugly engage leads 48 as described, thereby locking the brazing assembly 60 and the other washers 62, 63 and 64 in place with respect to wafer 37 and bores 42, 43 and 44. Thereafter, the remaining lead-ins 47 are dropped through the washers and into engagement with flanges 30, 31 and 32. The flanges are not yet secured to the electrode support 28 or electrodes 26, 27, and to prevent relative tilting thereof, it is desirable that the lead-ins drop freely through the washers and bores, i.e., that no force is required. For this reason openings 91 in washers 62–64 are made oversized. In the embodiment described, openings 91 (FIG. 3) are elliptical-like in shape, having a major axis of 24 mils and a minor axis of 20 mils. Such shape is a compromise between the requirements of a large opening permitting easy lead-in insertion and a small opening providing a small gap 92 between the brazing material washers and the metalized bore wall 94.

The loaded jig is then heated in a hydrogen furnace to melt the brazing material. The brazing assembly melts and the brazing material in each washer flows onto and along the lead-in and into the wafer bore associated therewith. The narrow bridges 68 between the washers melt apart and the brazing material flows towards the nearest mass of molten brazing material due to the surface tension of the molten copper, the non-wettability of the uncoated portions of ceramic wafer, and the wettability of the lead-ins and wafer bores. In this manner the leads are brazed to the wafer. Further, the brazing material on the flanges melts and provides the brazed joints between the electrodes 26 and 27 and the electrode support 28 and the flanges, and between the flanges and the lead-ins.

Although not shown, a finished electron tube may be made from the mount 12 by removing the brazed mount from the jig 10, placing a sleeve containing an electron emissive material over the tubular electrode support 28, and fitting a cup-shaped envelope shell over the mount and in contact with the periphery 38 of header wafer 37. A source of solder is positioned between the envelope tube shell and the wafer periphery. This assembly results in a complete tube assembly which is then subjected to a final furnace heating in vacuum. This final process step serves to evacuate the tube, sinter the electron emissive sleeve to the tube electrode support 28, and solder the envelope shell to the periphery 38 of the header wafer 37. The temperature employed in this final step is substantially below previous brazing temperatures. Accordingly, the previously made brazes are not adversely affected.

Although in the electron tube 10 described it is necessary that the bridges 68 between the brazing material washers break in order to separate the brazed joints, in some instances it may be desirable to provide an electrical connection between two lead-ins or between a lead-in and the tube envelope shell. Thus, as illustrated in phantom in FIG. 2, a conductive path 77 may be provided extending along the face of wafer 37 between a lead-in 47 and the wafer periphery 38. The shell of the tube is brazed to the wafer periphery, as described, thus providing an electrical connection between the shell and the conductive path 77.

To provide conductive path 77, the ceramic wafer 37 is provided with a metalized layer of molybdenum along path 77 similar to the metalized coatings on the walls of the wafer bores. A brazing material assembly (not shown) is employed which has an extension which coincides with path 77 in addition to its other brazing material sources. Upon heating and brazing, the extension of the assembly melts and wets the metalized path and adheres thereto. On cooling, a conductive layer remains.

While this invention has been described in connection with the assembly of electron tubes, it is clear that the invention may be used with various modifications in other devices for providing a plurality of separate or connected brazed joints. Thus, although not shown, brazing material assemblies may readily be provided for sealing the three lead-ins of semi-conductor devices to the ceramic wafers thereof. In such case, a brazing material assembly comprising three sources of brazing materials may be used, the assembly, however, being conveniently and simply placed over all three leads at the same time.

Further, it is apparent that many other shapes and configurations both of the brazing assembly and the brazing material sources within the assembly may be employed in accordance with the teachings of the invention. Also, means such as welding, cementing and the like may be employed to maintain the brazing assembly on the workpiece. Further still, the brazing material sources may be completely disconnected from each other, a volatile binder or plastic carrier serving to hold the assembly together. On heating, the carrier burns off leaving only the separate brazing material sources.

What is claimed is:

A method of assembling and brazing together a ceramic wafer having a plurality of apertures therethrough and a plurality of leads extending one each through each of said apertures, said wafer being non-wettable by a brazing material, and said apertures being arranged in a preselected pattern, said method utilizing an assembly of said brazing material including a plurality of annular portions arranged in a pattern similar to said preselected pattern and having narrow bridges connecting certain ones of said portions, some of said annular portions having an inner diameter larger than the diameters of said leads and said apertures, and said annular portions having a thickness to cause the brazing material therein to spread a preselected distance upon heating and melting of said brazing material at a preselected temperature, said method comprising:
  metalizing said leads and the walls of said apertures to provide brazing surfaces,
  inserting said leads through said wafer apertures,
  disposing said assembly with said annular portions in registry with said apertures, with the inside surface of said some annular portions spaced within said preselected distance of said apertures, and with said bridges adjacent non-metalized portions of said wafer between said apertures, and
  heating said assembly to said preselected temperature for causing flowing of said brazing material into said apertures and for causing said bridges to part and flow into said apertures.

References Cited by the Examiner
UNITED STATES PATENTS

| | | | |
|---|---|---|---|
| 2,131,890 | 10/38 | Hopkins | 29—500 X |
| 2,369,537 | 2/45 | Crawford | 29—489 |
| 2,424,522 | 7/47 | Wasserman | 29—500 X |
| 2,944,330 | 7/60 | Swick | 29—193.5 |
| 3,065,533 | 11/62 | Dungan et al. | 29—473.1 X |
| 3,089,324 | 5/63 | Deevy | 29—473.1 |

FOREIGN PATENTS 594,153  9/25  France.

JOHN F. CAMPBELL, *Primary Examiner.*